(12) United States Patent
Harvey et al.

(10) Patent No.: US 7,168,519 B2
(45) Date of Patent: Jan. 30, 2007

(54) SWITCH MOUNTING ASSEMBLY

(75) Inventors: Arthur James Harvey, Mantua, OH (US); Michael Eric Liedtke, Kent, OH (US)

(73) Assignee: Delta Systems, Inc., Streetsboro, OH (US)

( * ) Notice: Subject to any disclaimer, the term of this patent is extended or adjusted under 35 U.S.C. 154(b) by 454 days.

(21) Appl. No.: 10/827,591

(22) Filed: Apr. 19, 2004

(65) Prior Publication Data

US 2004/0201288 A1   Oct. 14, 2004

Related U.S. Application Data

(63) Continuation-in-part of application No. 10/626,375, filed on Jul. 24, 2003.

(51) Int. Cl.
*B62D 1/24* (2006.01)

(52) U.S. Cl. ..................... 180/320; 180/336

(58) Field of Classification Search ............. 180/315, 180/320, 333, 336; 200/16; 56/10.8, 320.1
See application file for complete search history.

(56) References Cited

U.S. PATENT DOCUMENTS

| | | | | |
|---|---|---|---|---|
| 3,984,967 A | * | 10/1976 | Jones | ............ 56/11.8 |
| 3,999,643 A | * | 12/1976 | Jones | ............ 477/87 |
| 4,016,709 A | * | 4/1977 | Hauser et al. | ........ 56/10.2 R |
| 4,341,129 A | * | 7/1982 | Bando | ............ 74/481 |
| 4,671,378 A | * | 6/1987 | Korrect et al. | ........ 180/336 |
| 4,795,865 A | | 1/1989 | Howard | |
| 5,190,019 A | | 3/1993 | Harvey | |
| 5,314,038 A | * | 5/1994 | Peterson, Jr. | ........ 180/274 |
| 5,375,674 A | * | 12/1994 | Peter | ........ 180/19.3 |
| 5,424,502 A | | 6/1995 | Williams | |
| 5,528,007 A | | 6/1996 | Williams et al. | |
| 5,548,888 A | | 8/1996 | Williams | |
| 5,994,857 A | * | 11/1999 | Peterson et al. | ........ 318/282 |
| 6,026,634 A | * | 2/2000 | Peter et al. | ........ 56/10.8 |
| 6,109,010 A | * | 8/2000 | Heal et al. | ........ 56/10.8 |
| 6,207,910 B1 | | 3/2001 | Harvey et al. | |
| 6,237,311 B1 | * | 5/2001 | Richards | ........ 56/10.5 |
| 6,316,891 B1 | * | 11/2001 | Hough | ........ 318/282 |
| 6,405,513 B1 | * | 6/2002 | Hancock et al. | ........ 56/10.8 |
| 6,591,594 B2 | * | 7/2003 | Hancock et al. | ........ 56/10.8 |
| 6,625,963 B2 | * | 9/2003 | Johnson | ........ 56/10.8 |
| 6,875,499 B1 | * | 4/2005 | De Toffol et al. | ........ 428/212 |

* cited by examiner

*Primary Examiner*—Paul N. Dickson
*Assistant Examiner*—Toan C. To
(74) *Attorney, Agent, or Firm*—Tarolli, Sundheim, Covell & Tummino LLP

(57) ABSTRACT

A switch mounting assembly that adapts a switch to detect a position of a vehicle control, such as the position of a drive control actuator of a lawn and garden tractor or similar vehicle. The switch mounting assembly includes a switch support member and a lever pivotally connected to the switch support member. The switch support member mounts a switch that includes an actuator that is biased to an extended position and a may be selectively depressed to a retracted position. The lever is pivotable between a first position that allows the actuator to be biased to the extended position and a second position that depresses the actuator to the retracted position.

15 Claims, 6 Drawing Sheets

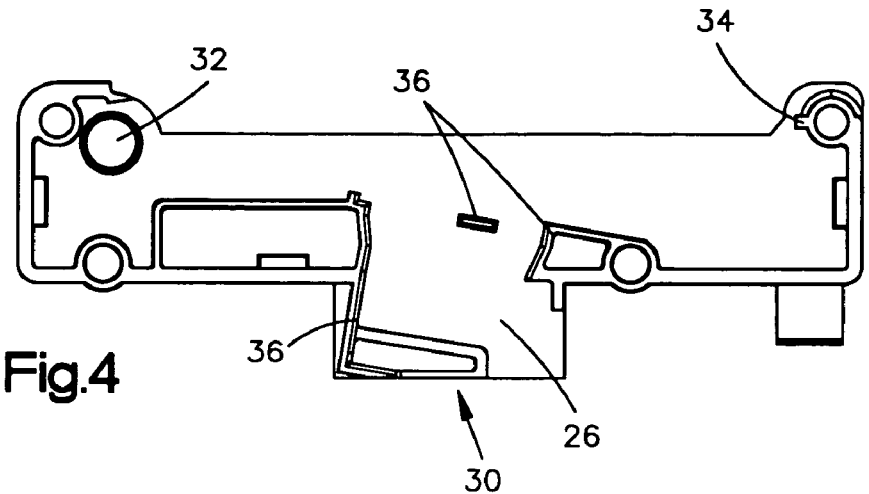
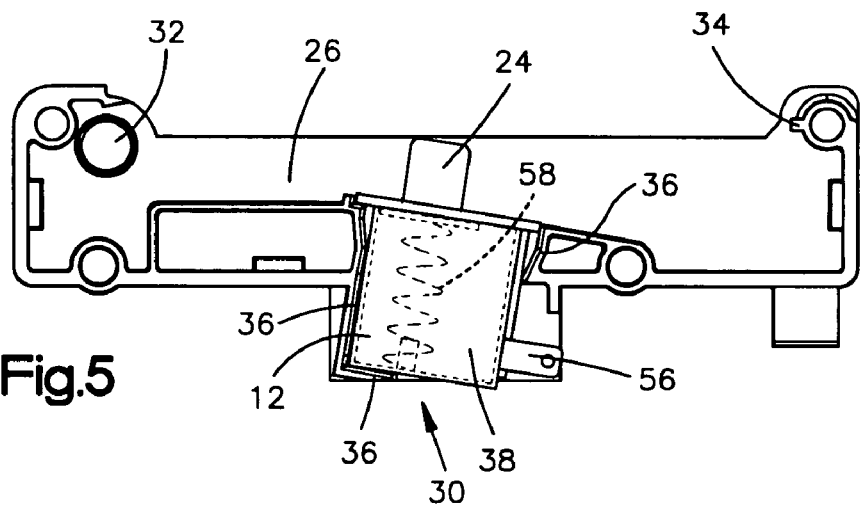
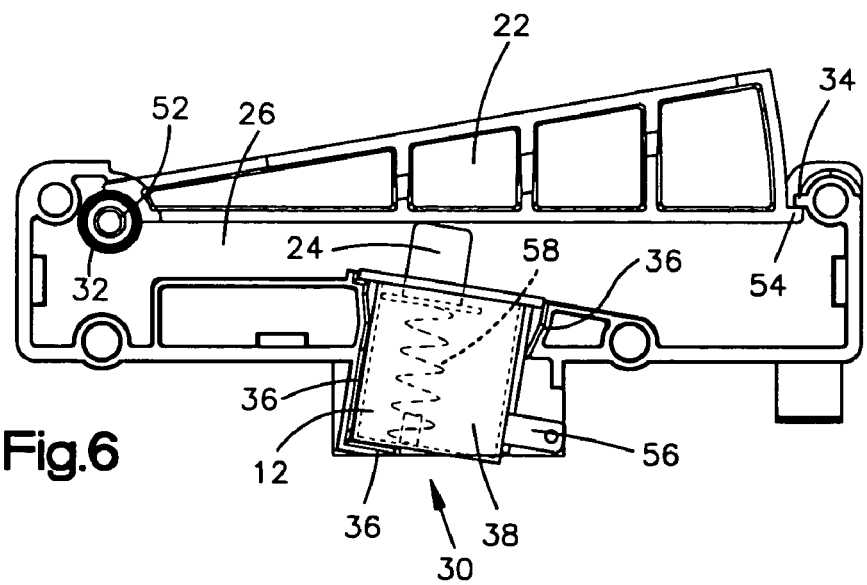

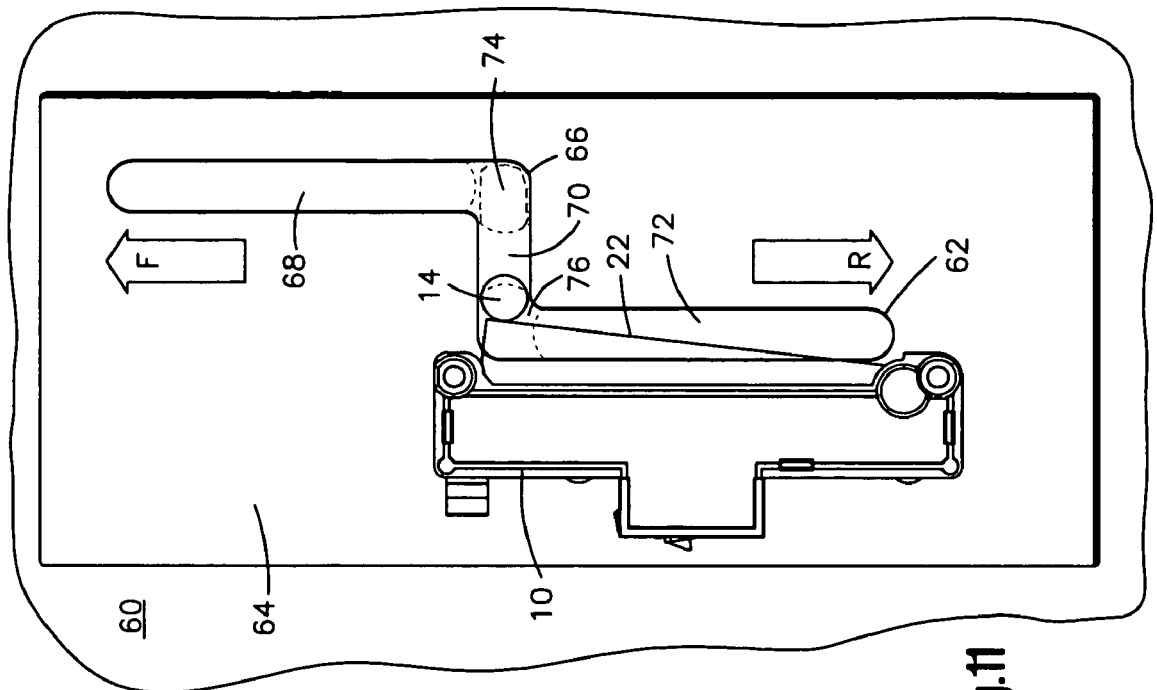
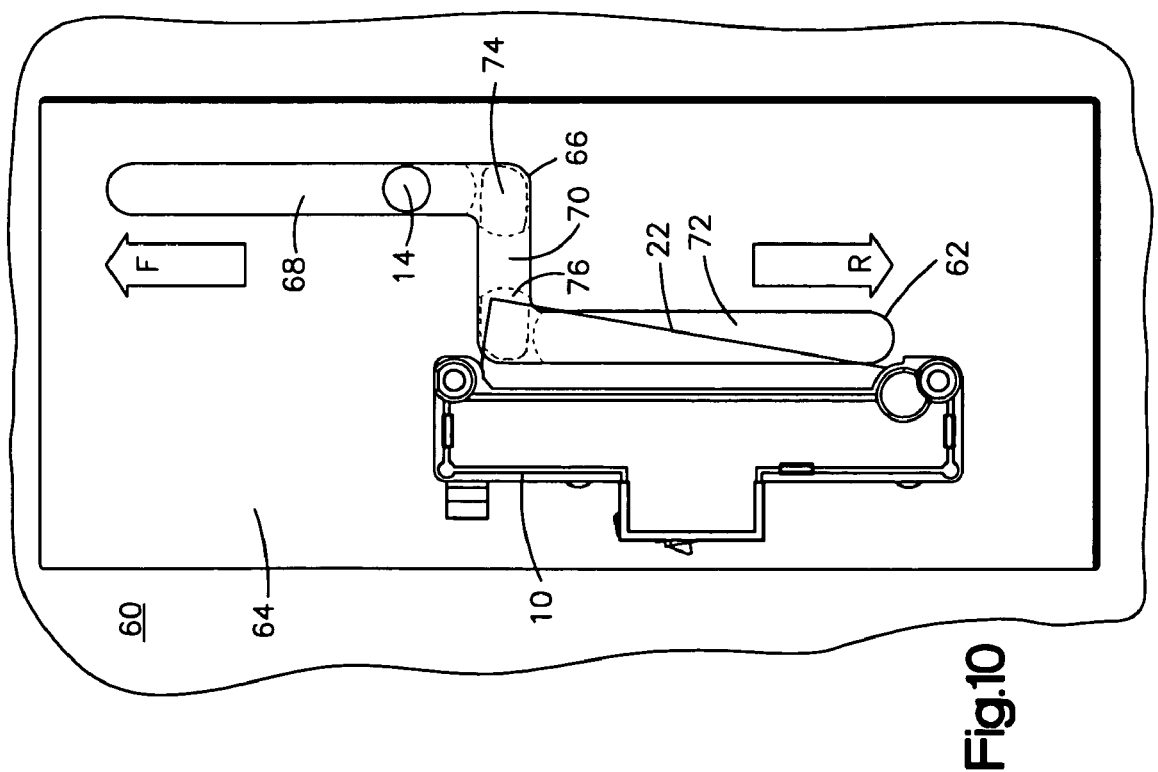

SWITCH MOUNTING ASSEMBLY

This is a continuation-in-part of copending application(s) Ser. No. 10/626,375 filed on Jul. 24, 2003.

FIELD OF THE INVENTION

The present disclosure relates generally to switch mounting assemblies and, in particular, the present disclosure concerns a switch mounting assembly that adapts a switch to detect a position of a vehicle control, such as the position of a drive control actuator of a lawn and garden tractor or similar vehicle.

BACKGROUND

Interlock circuits have been developed for lawn and garden tractors and similar vehicles that prevent these vehicles from being operated in an unsafe way. These interlock circuits typically include switches that are positioned to monitor various components of the lawn and garden tractor. Examples of components that may be monitored with switches include the seat, the clutch, the brake, the power take off, and the transmission. Switches used in interlock circuits typically include an elongated actuator that is linearly movable from a normal position to an actuated position. The states of the switches in the interlock circuit either indicate a safe condition or a potentially unsafe condition. If the states of the switches indicate a safe condition, the vehicle is allowed to continue to operate. If the states of the switches indicate an unsafe condition, the interlock circuit prevents continued operation of the vehicle or limits operation of one or more components of the vehicle.

SUMMARY

The present disclosure concerns a switch mounting assembly that adapts a switch to detect a position of a vehicle control, such as the position of a drive control actuator of a lawn and garden tractor or similar vehicle. The switch mounting assembly includes a switch support member and a lever pivotally connected to the switch support member. The switch support member mounts a switch that includes an actuator that is biased to an extended position and a may be selectively depressed to a retracted position. The lever is pivotable between a first position that allows the actuator to be biased to the extended position and a second position that depresses the actuator to the retracted position.

In one embodiment, the lever is biased to the second position by a spring that biases the switch actuator to the extended position. The lever may include a tab and the switch support member may include a shelf that engages the tab to limit rotation of the lever away from the switch. In one embodiment, the lever is a wedge shaped member that is at least partially disposed within the support member when the lever is rotated to the second position.

The switch mounting assembly can be used in an apparatus for sensing movement of a vehicle drive control actuator to a reverse position. The apparatus includes a path defining member, a switch mounting assembly, and a switch. The path defining member includes a cutout that defines a path of travel of the drive control actuator. The path of travel includes a forward drive position or portion, a neutral position or portion, and a reverse drive position or portion. The switch mounting assembly is located relative to the path defining member such that the lever is in a first position when the drive control actuator is in the forward drive position or portion and the lever is in a second position when the drive control actuator is in the reverse drive position or portion. The switch is secured by the switch mounting assembly. The switch includes an actuator that is in a biased or normal position when the drive control actuator sensing lever is in the first position. The actuator is moved to an actuated position when the lever is rotated with respect to the switch support member to the second position.

In one embodiment, the path of travel includes a neutral segment including a forward end portion and a reverse end portion. Movement of the drive control actuator to the neutral segment reverse end portion engages the actuator sensing member and moves the switch actuator to the actuated position. In this embodiment, the actuated position of the switch indicates that a user intends to put the vehicle in reverse or the vehicle is in reverse. In one embodiment, the path of travel includes a reverse segment and the lever is maintained in the second position as the drive control actuator is moved along the entire length of the reverse segment.

In one embodiment, the switch is a self contained unit. The switch includes first and second terminals that are selectively bridged by movement of the switch actuator to one of the biased position and the actuated position. The switch also includes a spring that biases the switch actuator to the biased position and the lever to the first position.

In a method of sensing movement of a drive control actuator to a reverse position, a drive control actuator path of travel including a forward drive portion, a neutral portion, and a reverse drive portion is defined. The pivotable lever is positioned relative to the drive control actuator path of travel such that the lever is in a first position when the drive control actuator is in the forward drive portion and the lever is in a second position when the drive control actuator is in the reverse drive portion. A switch actuator is positioned relative to the lever. The actuator is biased to the extended position when the lever is in the first position. The actuator is moved to an actuated position when the lever is rotated to the second position.

These and other objects and advantages of the system constructed in accordance with an exemplary embodiment of the invention is more completely described in conjunction with the accompanying drawings.

BRIEF DESCRIPTION OF THE DRAWINGS

FIG. 4 is an elevational view of a first half of a switch support member;

FIG. 5 is an elevational view of a switch mounted in a first half of a switch support member;

FIG. 6 is an elevational view of a switch mounted between a first half of a switch support member and a lever;

FIG. 10 is a schematic illustration of a drive control actuator and an apparatus for sensing a position of a drive control actuator with the drive control actuator in a forward position;

FIG. 11 is an illustration similar to the illustration of FIG. 10 with the drive control actuator in a neutral position;

DETAILED DESCRIPTION

Figure 1:
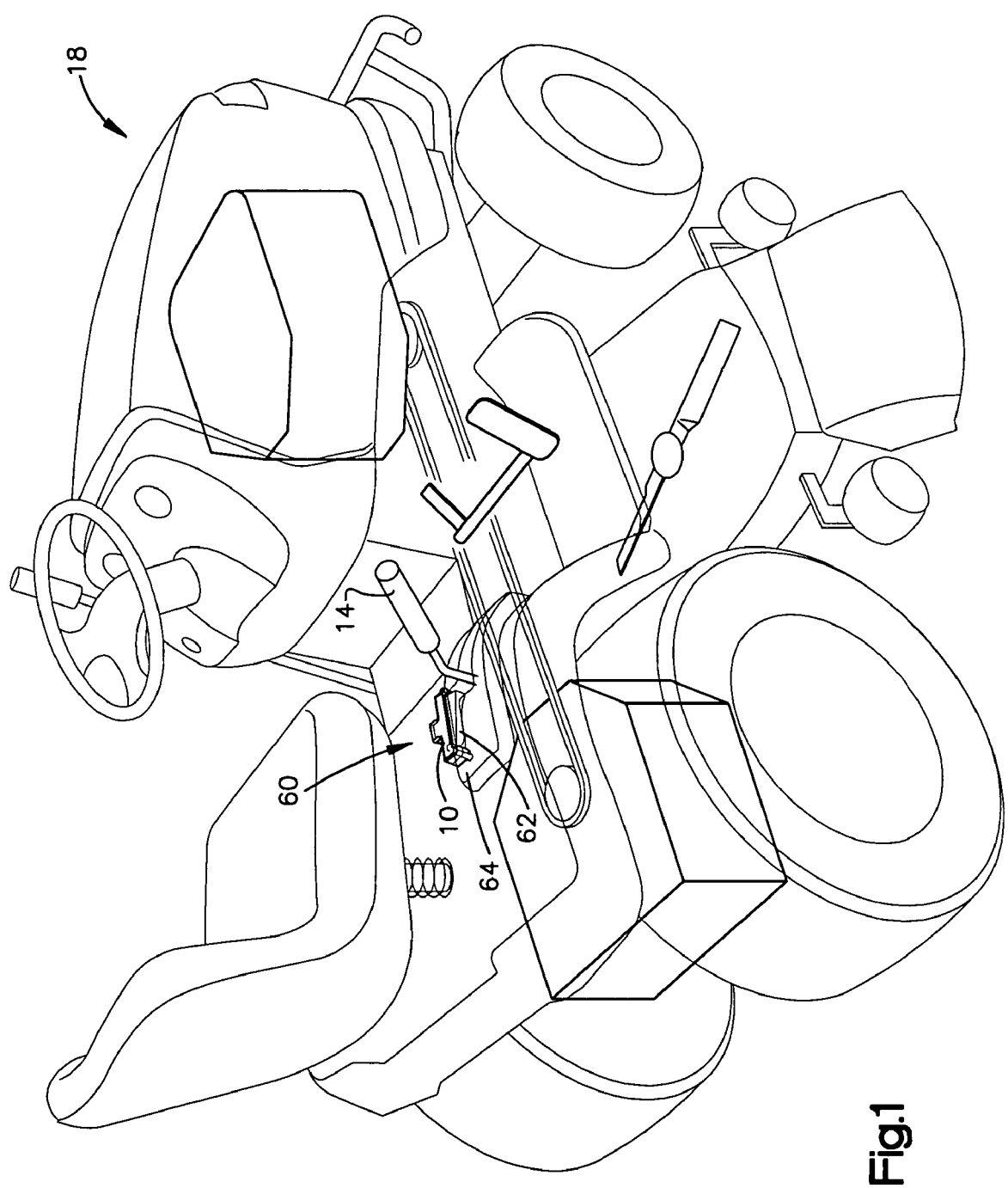
FIG. 1 is an illustration of a lawn and garden tractor.
Figure 2:
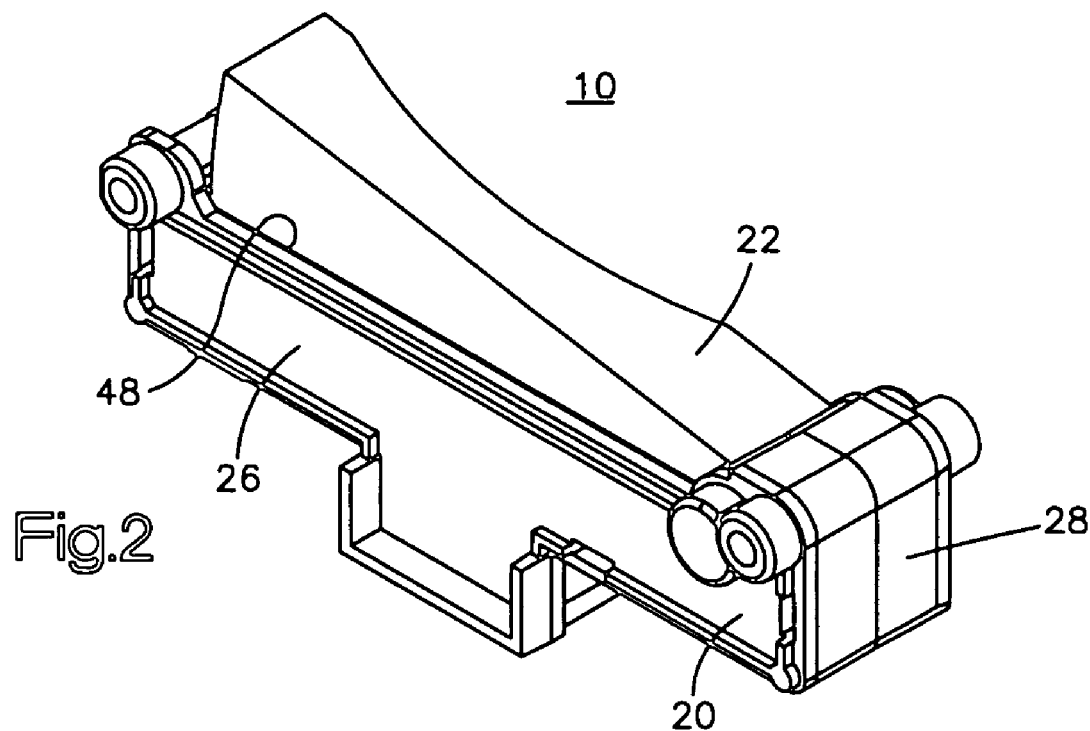
FIG. 2 is a perspective view of a switch mounting assembly.
Figure 3:
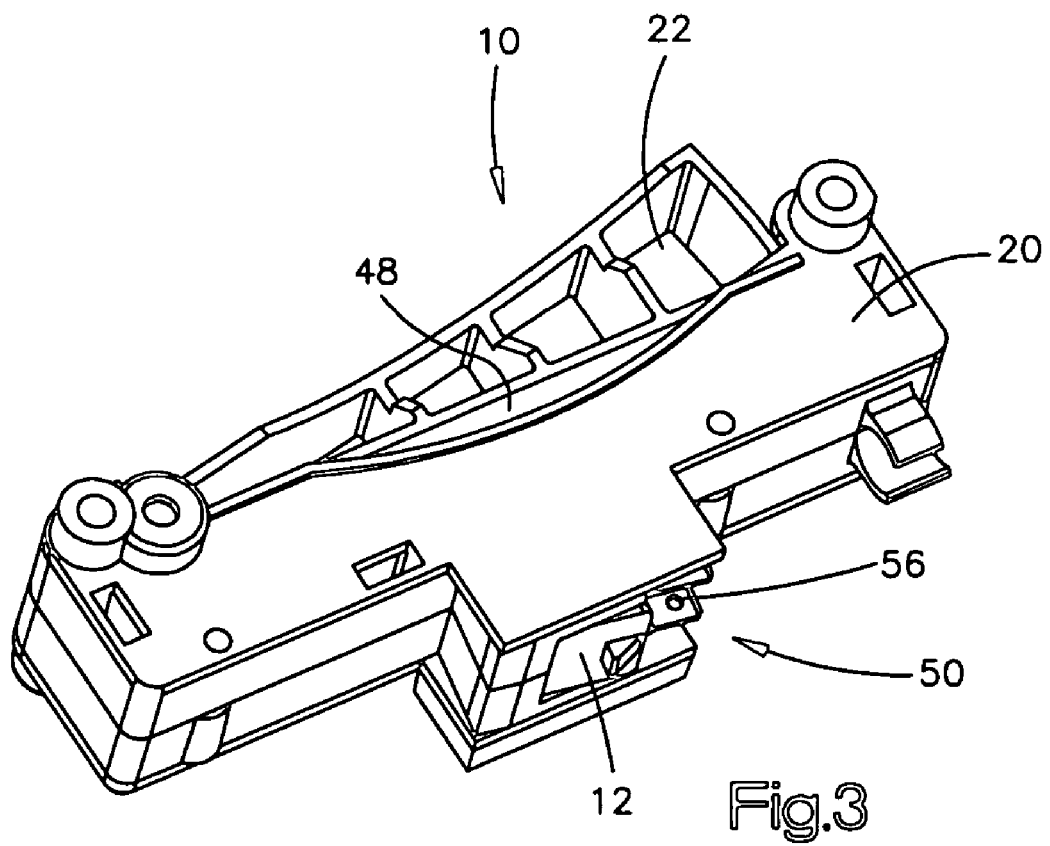
FIG. 3 is a perspective view of a switch mounted in a switch mounting assembly.
Figure 7:
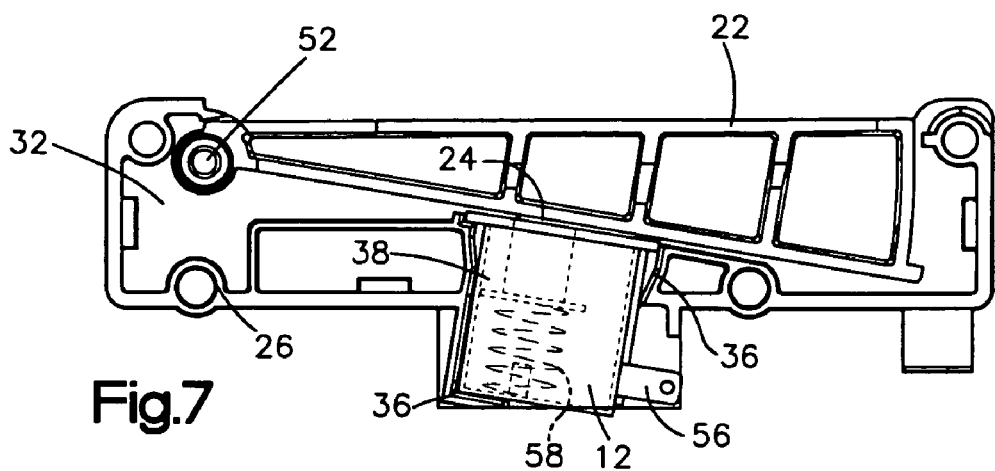
FIG. 7 is a view similar to the view of FIG. 6 with the lever in a depressed position.

The present disclosure concerns a switch mounting assembly 10 that adapts a switch 12 to detect a position of a vehicle control 14. In the embodiment illustrated by FIG. 1, the vehicle control 14 is a drive control actuator of a lawn and garden tractor 18 or similar vehicle. Referring to FIGS. 2 and 3, the switch mounting assembly 10 includes a switch support member 20 or housing and a lever 22 pivotally connected to the switch support member. Referring to FIGS. 2–9, the switch support member 20 mounts a switch 12 that includes an actuator 24 that is biased to an extended position (FIGS. 6 and 8) and a may be selectively depressed to a retracted position (FIGS. 7 and 9). The lever 22 is pivotable between a first position (FIGS. 6 and 8) that allows the actuator 24 to be biased to the extended position and a second position (FIGS. 7 and 9) that depresses the actuator to the retracted position.

In the illustrated embodiment, the switch support member 20 includes a first half 26 and a second half 28. Referring to FIGS. 4–6, the first half includes switch locating structure 30, a pivot defining recess 32, and a lever limiting shelf 34. In the illustrated embodiment, the switch locating structure comprises projections 36 that bound a switch housing 38 to prevent the switch 12 from moving within support member 20.

Figure 8:
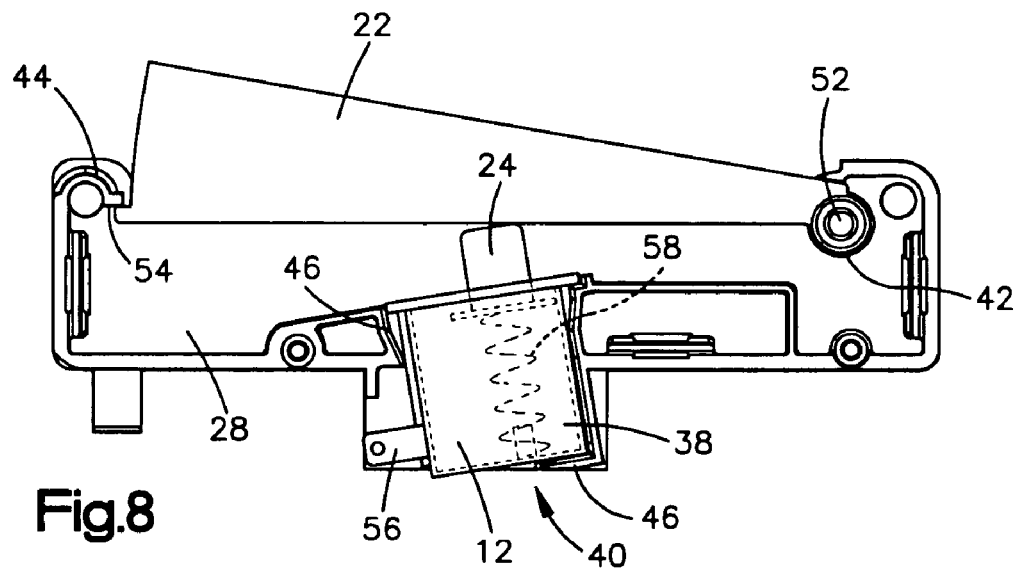
FIG. 8 is an elevational view of a switch mounted between a second half of a switch support member and a lever.
Figure 9:
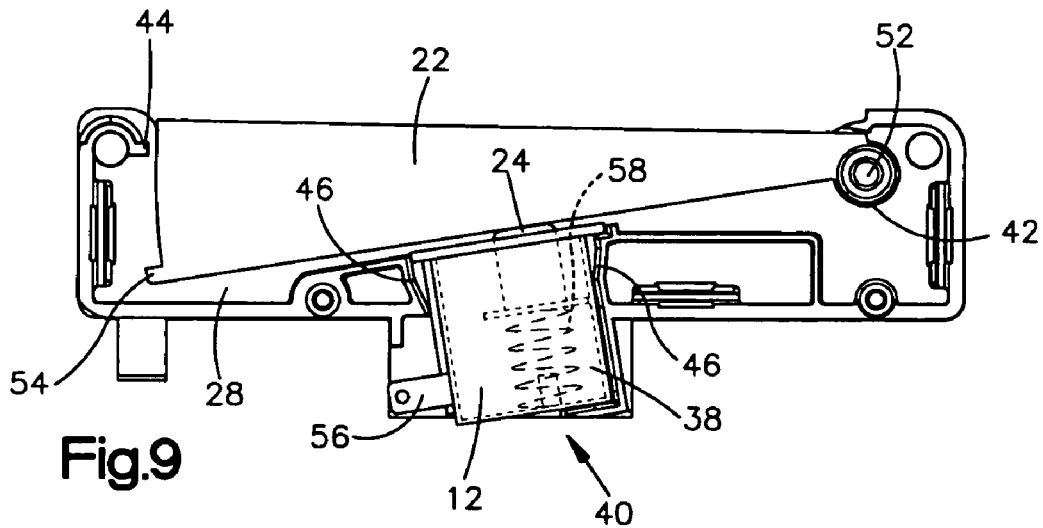
FIG. 9 is a view similar to the view of FIG. 8 with the lever in a depressed position.

Referring to FIGS. 8 and 9, the second half includes switch locating structure 40, a pivot defining recess 42, and a lever limiting shelf 44. In the illustrated embodiment, the switch locating structure comprises projections 46 that bound the switch housing 38 to prevent the switch 12 from moving within support member 20. Referring to FIGS. 2 and 3, when the first half 26 is assembled to the second half 28, a lever opening 48 and a switch terminal opening 50 are defined.

Referring to FIGS. 6–9, the lever 22 is a wedge shaped member that includes pivot defining bosses 52 and a rotation limiting tab 54. The pivot defining bosses 52 are rotatably accepted by the pivot defining recesses 32, 42, allowing rotation of the lever with respect to the support member about an axis defined by the bosses 52. The lever 22 extends through the lever opening 48 (FIG. 3). The rotation limiting tab 54 engages the lever limiting shelf 34 to prevent rotation of the lever 22 completely out of the support member 20.

When the two halves 26, 28 are assembled, the switch 12 is secured in the switch mounting assembly 10. Switch terminals 56 extend out of the switch terminal opening 50. Referring to FIGS. 5–9, the switch 12 includes a spring 58 that biases the switch actuator 24 to the biased position and the lever 22 to the first position (FIGS. 6 and 8). The illustrated switch is a self contained unit. The terminals 56 are selectively bridged by movement of the switch actuator to one of the biased position and the actuated position. It should be readily apparent that the switch mounting assembly could be easily adapted to accommodate a wide variety of switches without departing from the spirit and scope of the appended claims. An example of one such switch that can be used in the switch mounting assembly is shown and described in U.S. Pat. No. 4,812,604 to Howard, which incorporated herein in its entirety.

FIGS. 1 and 10–13 illustrate and embodiment where the switch mounting assembly 10 is used in an apparatus 60 for sensing movement of the drive control actuator 14 to a reverse position 62. The apparatus includes a path defining member 64, a switch mounting assembly 10, and a switch 12. The path defining member includes a cutout 66 that defines a path of travel of the drive control actuator 14. The path of travel includes a forward drive position or portion 68, a neutral position or portion 70, and a reverse drive position or portion 72. The switch mounting assembly 10 is located relative to the path defining member 64 such that the lever 22 is in the first position (FIG. 10) when the drive control actuator is in the forward drive position or portion 68 and the lever is in a second position (FIG. 13) when the drive control actuator 14 is in the reverse drive position or portion 72. The switch actuator 24 is in the biased or normal position when the drive control actuator sensing lever 22 is in the first position (FIGS. 6 and 8). The switch terminals 56 are in a first state when the switch actuator is in the normal position, i.e. open or closed. The actuator 24 is moved to an actuated position when the lever 22 is rotated with respect to the switch support member to the second position (FIGS. 7 and 9). The switch terminals 56 are in an opposite state when the switch actuator is in the normal position. That is, a terminal bridges the terminals to go from an open state to a closed state or the contact no longer contacts both terminals to go from a closed state to an open state. The terminals are connected to an interlock circuit to provide a status of the position of the drive control actuator. This status may be in reverse/intent to go into reverse and not in reverse.

Figure 12:
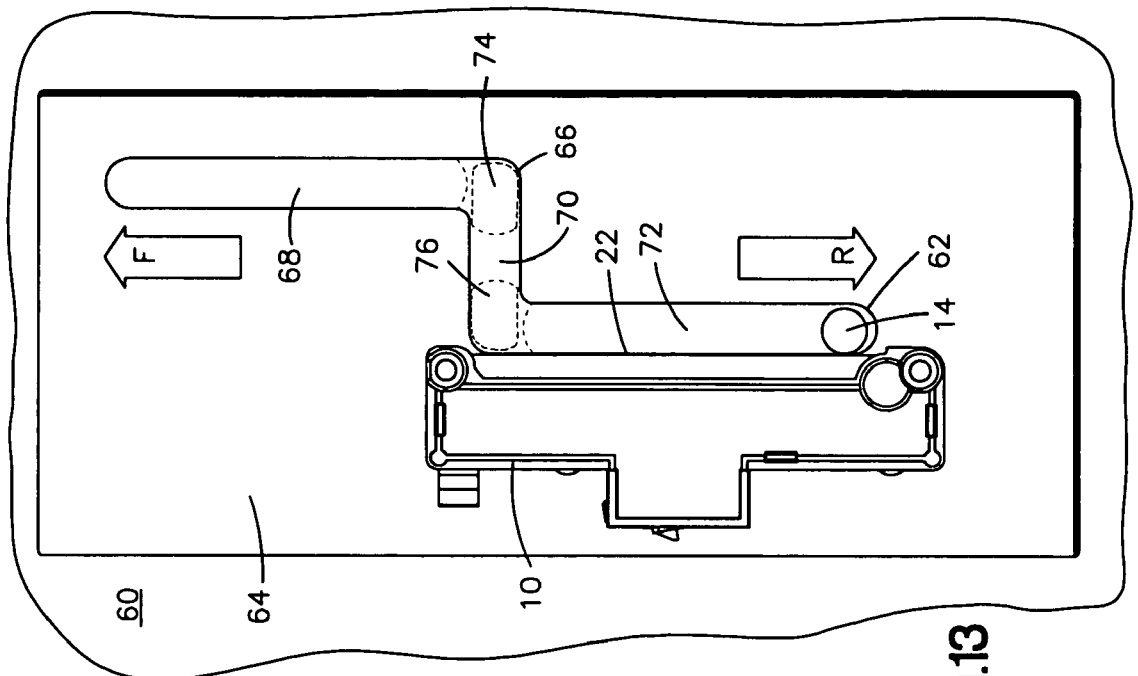
FIG. 12 is an illustration similar to the illustration of FIG. 10 with the drive control actuator in a neutral position.
Figure 13:
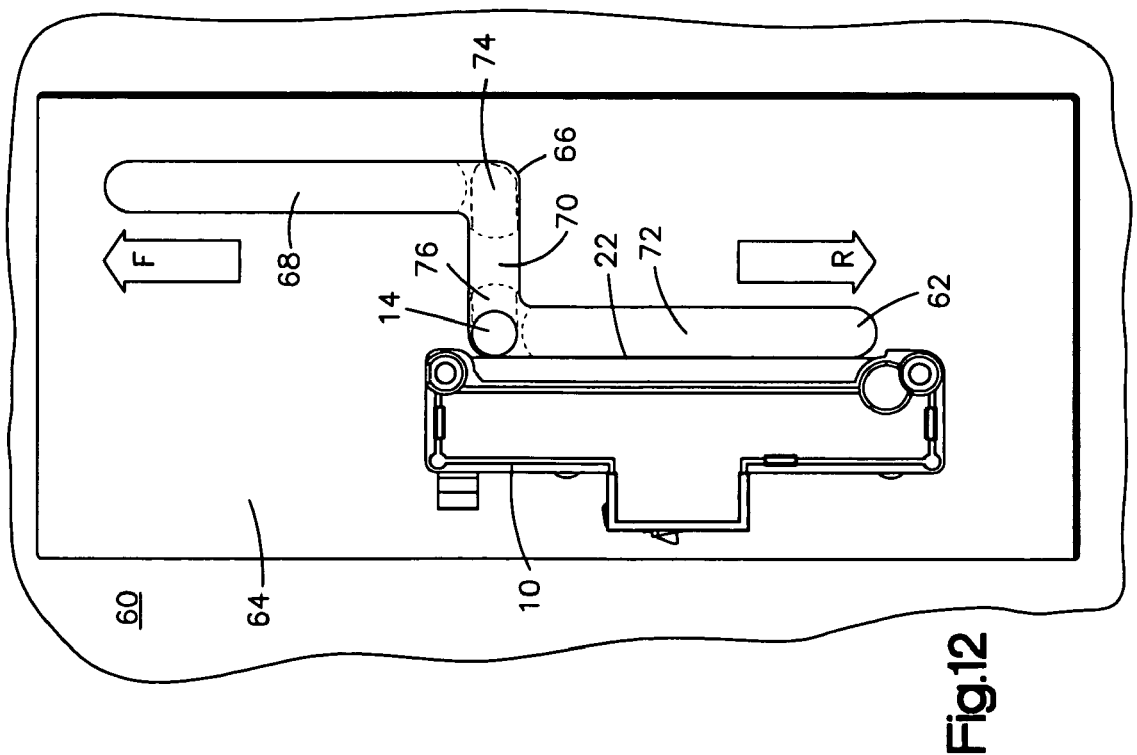
FIG. 13 is an illustration similar to the illustration of FIG. 10 with the drive control actuator in a reverse position.

FIG. 10 illustrates the drive control actuator 14 in the forward portion 68. When the drive control actuator is in the forward portion, the lever 22 and the actuator 24 are biased to the normal position and the terminals 56 are in the first state (open or closed). FIGS. 11 and 12 illustrate the drive control actuator 14 in the neutral portion 70. FIG. 13 illustrates the drive control actuator in the reverse portion 72. In the illustrated embodiment, the lever 22 is maintained in the second position as the drive control actuator is moved along the entire length of the reverse segment.

The illustrated neutral portion 70 of the path of travel includes a forward end portion 74 and a reverse end portion 76. In the illustrated embodiment, movement of the drive control actuator 14 to the neutral segment reverse end portion 76 engages the lever 22 and moves the switch actuator to the actuated position. In this embodiment, the lawn and garden tractor 18 is not in reverse when the drive control actuator is in the neutral segment reverse end portion 76. In this embodiment, the lawn and garden tractor 18 is placed in reverse as the drive control actuator 14 is moved from the position illustrated by FIG. 12 to the position illustrated by FIG. 13. In this embodiment, the states of the switch 12 are:

State 1 (actuator extended): not in reverse.

State 2 (actuator depressed): an intent of the operator to go into reverse (drive control actuator is in the neutral segment reverse end portion 76) or the tractor is in reverse (drive control actuator is in the reverse portion 72).

In an alternate embodiment, the lever 22 is not engaged until the drive control actuator 14 is moved into the reverse portion 72. In this embodiment, the states of the switch 12 are:

State 1 (actuator extended): not in reverse.
State 2 (actuator depressed): in reverse.

In use, an interlock circuit uses the state of the switch terminals 56 to sense movement of a drive control actuator 14 to the reverse position. In the illustrated embodiment, movement of the of the drive control actuator 14 to the junction between the neutral portion 70 and the reverse drive portion 72 moves the lever 22 to the second position and thereby moves the switch actuator 24 to the actuated position. The state of the switch terminals is changed when the lever 22 is moved to the actuated position to provide an indication of the position of the drive control actuator to the interlock circuit.

While the present invention has been described with a degree of particularity, it is the intent that the invention include all modifications and alterations falling within the spirit or scope of the appended claims.

The invention claimed is:

1. An apparatus for sensing a position of a drive control actuator to a reverse position, comprising:
   a) a path defining member including a cutout that defines a path of travel of the drive control actuator, the path of travel including a forward drive position, a neutral position, and a reverse drive position;
   b) a switch mounting assembly including a switch support member and a drive control actuator sensing lever pivotally connected to the switch support member, the switch mounting assembly being located relative to the path defining member such that the lever is in a first position when the drive control actuator is in the forward drive position and the lever is in a second position when the drive control actuator is in the reverse drive position;
   c) a switch secured by the switch mounting assembly, the switch including an actuator that is in a biased position when the lever is in the first position and is moved to an actuated position when the lever is rotated with respect to the switch support member to the second position.

2. The apparatus of claim 1 wherein the path of travel includes a neutral segment including a forward end portion and a reverse end portion and wherein movement of the of the drive control actuator to the neutral segment reverse end portion engages the lever and moves the switch actuator to the actuated position.

3. The apparatus of claim 1 wherein the switch includes first and second terminals that are selectively bridged by movement of the switch actuator to one of the biased position and the actuated position.

4. The apparatus of claim 1 wherein the switch includes a spring that biases the switch actuator to the biased position and the lever to the first position.

5. The apparatus of claim 1 wherein the lever includes a tab and the switch support member includes a shelf that engages the tab to limit rotation of the lever away from the switch.

6. The apparatus of claim 1 wherein the lever is a wedge shaped member that is at least partially disposed within the support member when the lever is rotated to the second position.

7. The apparatus of claim 1 wherein the path of travel includes a reverse segment wherein the lever is maintained in the second position as the drive control actuator is moved along the reverse segment.

8. The apparatus of claim 1 wherein the switch is a self contained unit.

9. The apparatus of claim 8 wherein the switch includes a housing, first and second selectively bridgeable terminals and a contact that bridges the first and second bridgeable terminals when the switch actuator is in one of the biased position and the actuated position.

10. A method of sensing movement of a drive control actuator to a reverse position, comprising:
    a) defining a drive control actuator path of travel including a forward drive portion, a neutral portion, and a reverse drive portion;
    b) positioning a pivotable lever relative to the drive control actuator path of travel such that the lever is in a first position when the drive control actuator is in the forward drive portion and the lever is in a second position when the drive control actuator is in the reverse drive portion;
    c) supporting a switch actuator relative to the lever;
    d) biasing the actuator to a biased position when the lever is in the first position; and
    e) moving the actuator to an actuated position when the lever is rotated to the second position.

11. The method of claim 10 wherein movement of the of the drive control actuator to a junction between the neutral portion and the reverse drive portion moves the lever to the second position and thereby moves the switch actuator to the actuated position.

12. The method of claim 10 further comprising bridging first and second terminals upon movement of the switch actuator to one of the biased position and the actuated position.

13. The method claim 10 further comprising biasing the lever to the first position with a spring that biases the switch actuator to the biased position.

14. The method of claim 10 further comprising limiting rotation of the actuator sensing member away from the switch.

15. The method of claim 10 further comprising maintaining the lever in the second position as the drive control actuator is moved along the reverse portion.

* * * * *